(12) United States Patent
Fischer et al.

(10) Patent No.: US 10,842,086 B2
(45) Date of Patent: Nov. 24, 2020

(54) THERMAL PLANT TREATMENT AND A MACHINE TO APPLY THE TREATMENT

(71) Applicant: Lazo TPC Global, Inc., Napa, CA (US)

(72) Inventors: Martin Fischer, Walnut Creek, CA (US); Art Dawson, Chino Hills, CA (US)

(73) Assignee: Lazo TPC Global, Inc., Napa, CA (US)

( * ) Notice: Subject to any disclaimer, the term of this patent is extended or adjusted under 35 U.S.C. 154(b) by 0 days.

(21) Appl. No.: 13/261,934

(22) PCT Filed: Mar. 22, 2013

(86) PCT No.: PCT/US2013/000092
§ 371 (c)(1),
(2) Date: Aug. 1, 2014

(87) PCT Pub. No.: WO2013/147962
PCT Pub. Date: Oct. 3, 2013

(65) Prior Publication Data
US 2014/0338258 A1   Nov. 20, 2014

Related U.S. Application Data

(60) Provisional application No. 61/848,643, filed on Jan. 8, 2013, provisional application No. 61/685,745, filed on Mar. 24, 2012.

(51) Int. Cl.
*A01G 13/06* (2006.01)
*A01G 13/08* (2006.01)

(52) U.S. Cl.
CPC .............. *A01G 13/06* (2013.01); *A01G 13/08* (2013.01)

(58) Field of Classification Search
CPC ........ A01G 13/06; A01G 13/08; A01G 1/001; A01G 7/06; A01G 11/00; A01G 13/065;
(Continued)

(56) References Cited

U.S. PATENT DOCUMENTS 1,306,209 A *  6/1919  Williams ............... A01H 1/025
                                                43/141
1,398,927 A * 11/1921  Whitlock ............... A01G 13/06
                                                416/146 R
(Continued)

FOREIGN PATENT DOCUMENTS

EP         0845204 A2    6/1998
WO    WO2011085463 A1    7/2011

OTHER PUBLICATIONS

The Effects of Temperature, Photoperiod and Light Integral on the Time to Flowering of Pansy cv. Universal Violet, by: Adams, Pearson and Hadley; The Dept. of Horticulture, 1997.*
(Continued)

*Primary Examiner* — Ebony E Evans
(74) *Attorney, Agent, or Firm* — Kinney & Lange, P.A.

(57) ABSTRACT

The invention relates to a method of impacting the fruit production of a plant or crop by applying short-duration thermal shock streams of hot air to the plant periodically to impact the flavonoid biosynthetic pathway mechanisms in a plant thereby improving its fruit. The method includes the steps of (1) passing by the plant in a row at a speed of 1-5 mph in an improved Thermal Plant Treatment (TPT) machine, (2) ejecting from the TPT machine at least one hot stream of air in the direction of the unit plant area for no more than 15 seconds per unit plant area per pass, (3) optionally measuring the thermal shock profile that the plant is subjected with thermal sensors, and (4) repeating the thermal shock profile treatment steps (1) and (2) at pre-
(Continued)

Air Intake and Outflow in a TPT machine determined regular intervals over at least a fraction of the crop year.

17 Claims, 6 Drawing Sheets

(58) Field of Classification Search
CPC ...... A01G 15/00; A01G 17/02; A01G 17/026; E01H 13/00
USPC ........ 47/2, 1.41, 1.42, 1.43, 1.44, 1.5, 1.7, 5
See application file for complete search history.

(56) References Cited

U.S. PATENT DOCUMENTS

| | | | | |
|---|---|---|---|---|
| 2,154,002 | A * | 4/1939 | Kerrick | A01G 13/065 110/238 |
| 2,175,422 | A * | 10/1939 | Selichi | A01G 13/065 126/299 R |
| 2,639,553 | A * | 5/1953 | Russell | A01D 91/00 126/271.2 C |
| 3,067,541 | A * | 12/1962 | Smith | A01G 13/06 239/227 |
| 3,210,059 | A * | 10/1965 | Nesbitt | F24H 3/006 432/222 |
| 3,626,636 | A * | 12/1971 | Wheeler | A01M 15/00 126/271.2 A |
| 3,636,939 | A * | 1/1972 | Sijbring | F22B 1/26 126/271.2 R |
| 3,712,803 | A * | 1/1973 | Grybek et al. | A01N 63/10 504/189 |
| 3,830,014 | A * | 8/1974 | Baker | A01G 13/065 239/130 |
| 4,353,505 | A * | 10/1982 | Kinder | A01M 7/0064 239/167 |
| 4,513,529 | A * | 4/1985 | Reich | A01G 13/06 47/2 |
| 4,991,342 | A * | 2/1991 | Maher | A01D 82/00 47/1.7 |
| 5,030,086 | A * | 7/1991 | Jones | A01M 21/04 126/271.2 C |
| 5,366,154 | A * | 11/1994 | Thompson | A01M 7/0042 239/13 |
| 5,848,492 | A * | 12/1998 | Brown | A01G 11/00 47/1.44 |
| 5,934,013 | A * | 8/1999 | Barra | A01G 13/06 237/12.3 A |
| 5,974,728 | A * | 11/1999 | Nichols | A01M 1/06 43/140 |
| 6,014,835 | A * | 1/2000 | Pivonka | A01M 15/00 47/1.44 |
| 6,047,900 | A * | 4/2000 | Newson | B05B 9/002 239/135 |
| 6,505,437 | B1 * | 1/2003 | Johnstone | A01M 21/04 47/1.44 |
| 7,109,162 | B2 * | 9/2006 | Wolfe | A23L 1/3002 514/15.1 |
| 7,134,239 | B2 * | 11/2006 | Barra | A01M 1/2094 43/132.1 |
| 7,663,025 | B2 * | 2/2010 | Heard | C07K 14/415 800/289 |
| 2003/0200696 | A1 | 10/2003 | Barra | |
| 2012/0183594 | A1 * | 7/2012 | Glenn | A01N 3/00 424/443 |
| 2016/0174475 | A1 * | 6/2016 | Mirzakhani Nafchi | A01G 7/06 47/1.3 |
| 2018/0072634 | A1 * | 3/2018 | Nakagawa | C12N 1/16 |
| 2018/0310565 | A1 * | 11/2018 | Sakamoto | C05F 11/10 |
| 2020/0053966 | A1 * | 2/2020 | Tahvonen | A01G 7/06 |

OTHER PUBLICATIONS

The Effects of Temperature on Plant Growth; by F. W,. Went, Annual Rev. Plant. Pysiology. 1953, 4:347-362.*
Cohen S. D. et al, "Assessing the Impact of Temperature on Grape Phenolic Metabolism," Analytica Chimica Acta, Elsevier Amsterdam, NL, vol. 621, No. 1, Jul. 21, 2008, pp. 57-67.
Communication Pursuant to Article 94(3) EPC for EP Application No. 13767438.8, dated Jun. 25, 2018, pp. 6.
Extended European Search Report for EP Application No. 13767438. 8, dated Nov. 3, 2015, pp. 8.
International Search Report and Written Opinion for PCT Application No. PCT/US2013/000092, dated Jul. 12, 2013, p. 8.
Kang, HM et al. "Activity of Enzymatic Antioxidant Defense Systems in Chilled and Heat Shocked Cucumber Seedling Radicles" Physiologia Plantarum, May 21, 201, vol. 113, pp. 548-556, ISSN:0031-9317.
Kang, HM, et al., "Elevated Growing Temperatures During the Day Imporove the Postharvest Chilling Tolerance of Greenhouse-grown Cucumber (Cucumis sativus) Fruit," Postharvest Biology and Technology, 2002, vol. 24, pp. 49-57.

* cited by examiner

Figure 1: Time temperature response of a unit plant environ in the application of TPT.
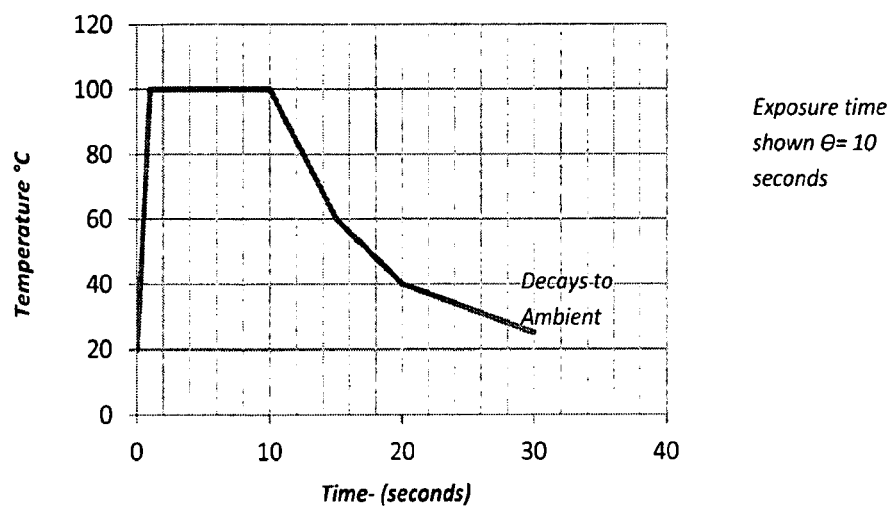

Figure 2: Two examples of Wine Chemistry Analysis
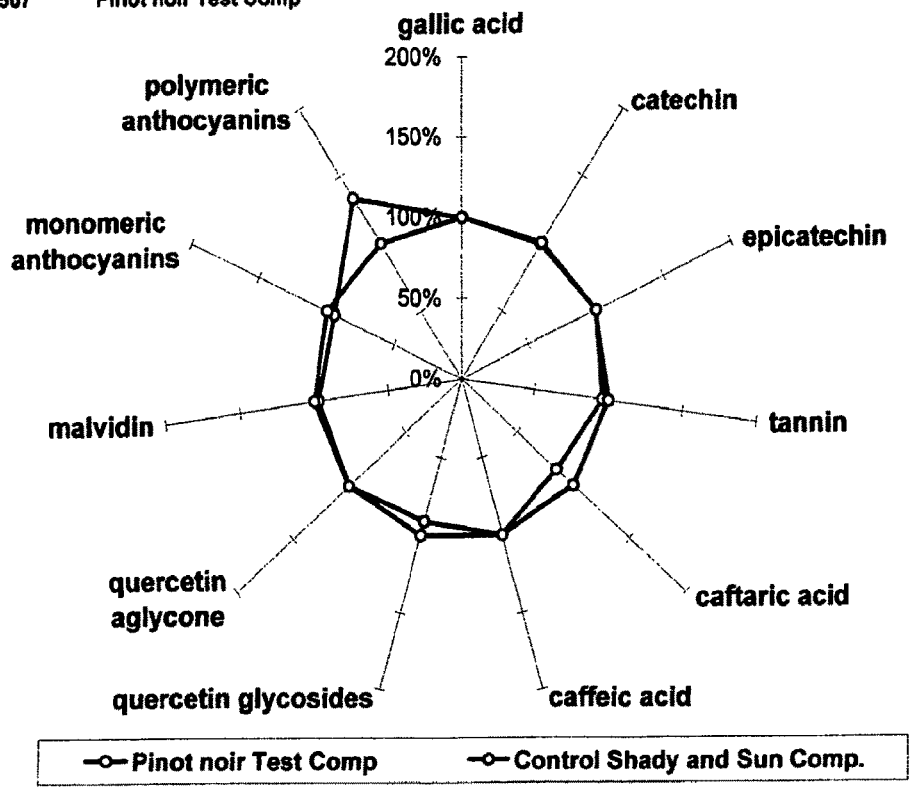
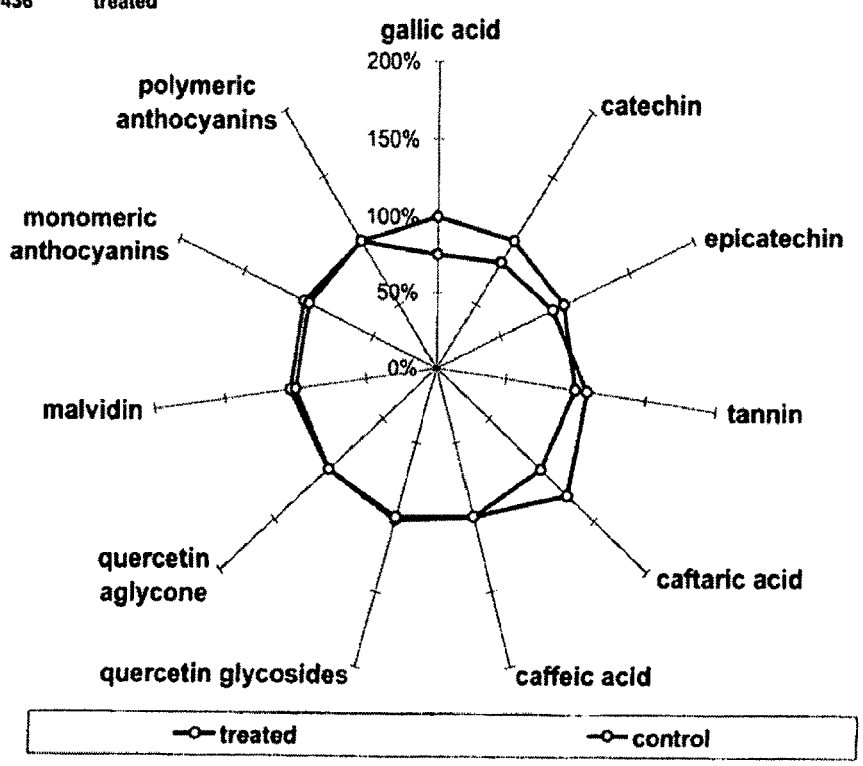

Figure 3: Air Intake and Outflow in a TPT machine
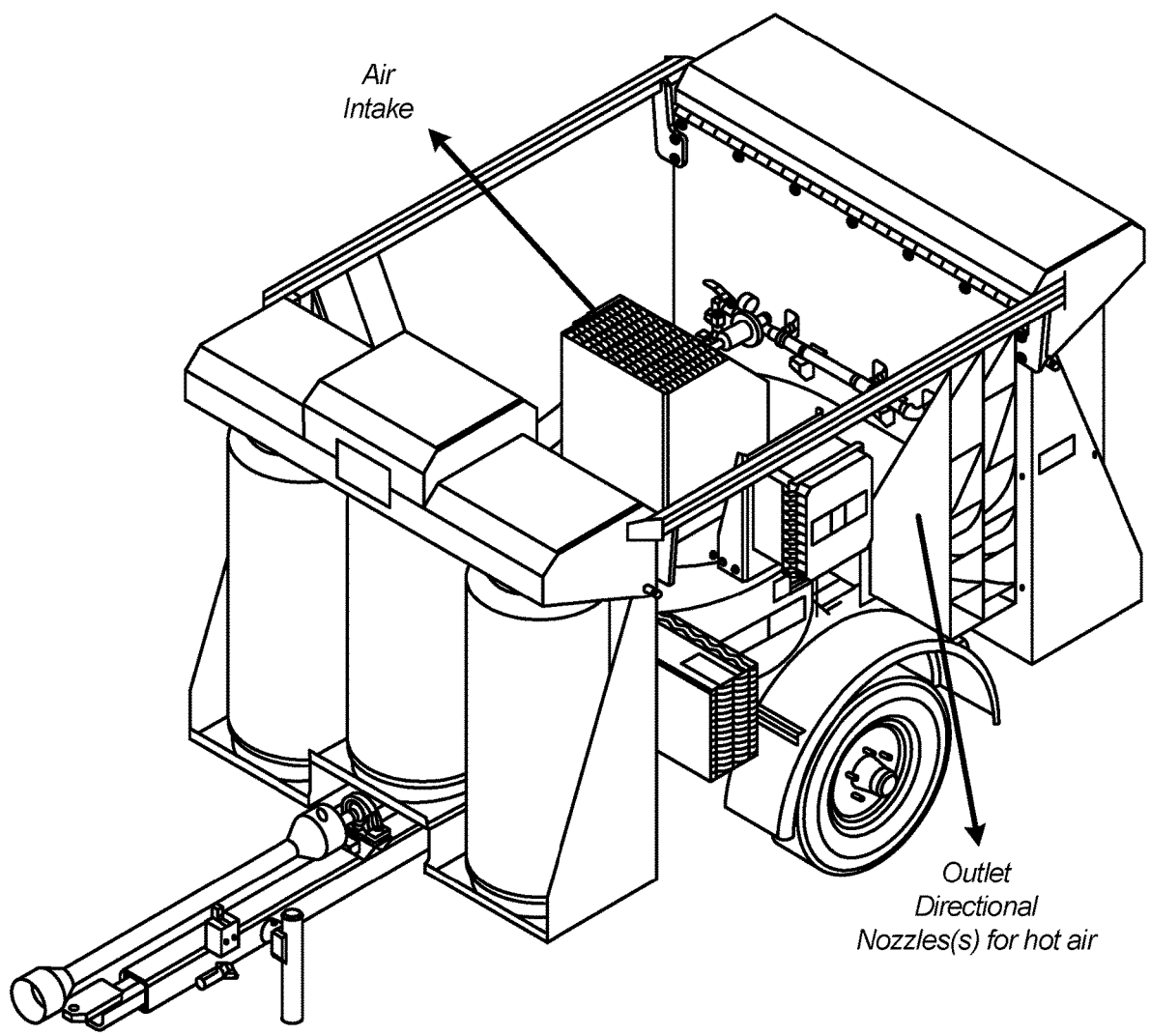

Figure 4: Improvements over prior art machines for precise and accurate TPT
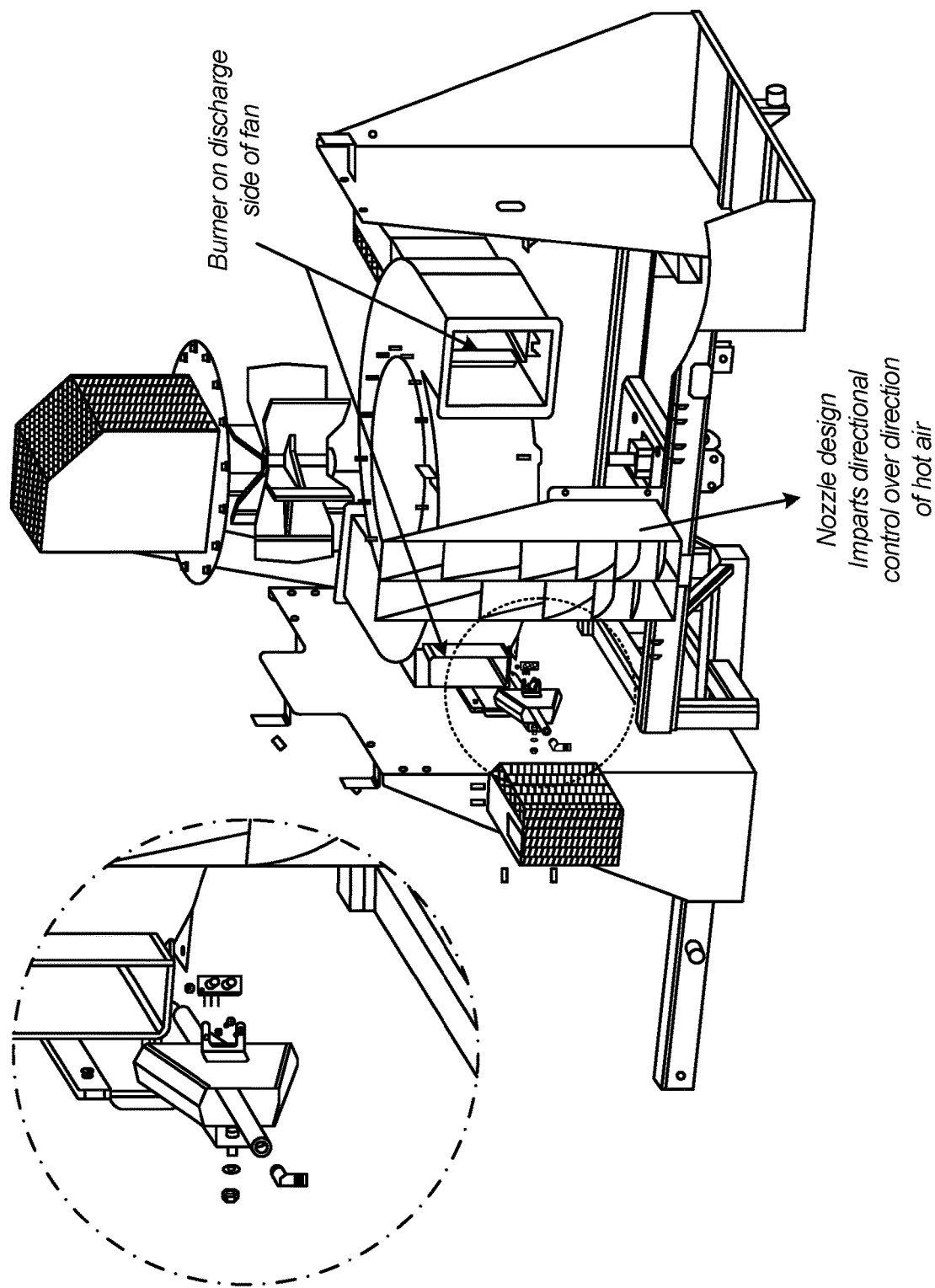

Figure 5. A TPT machine in application mode with thermal gradient created by the blown hot air onto a tree
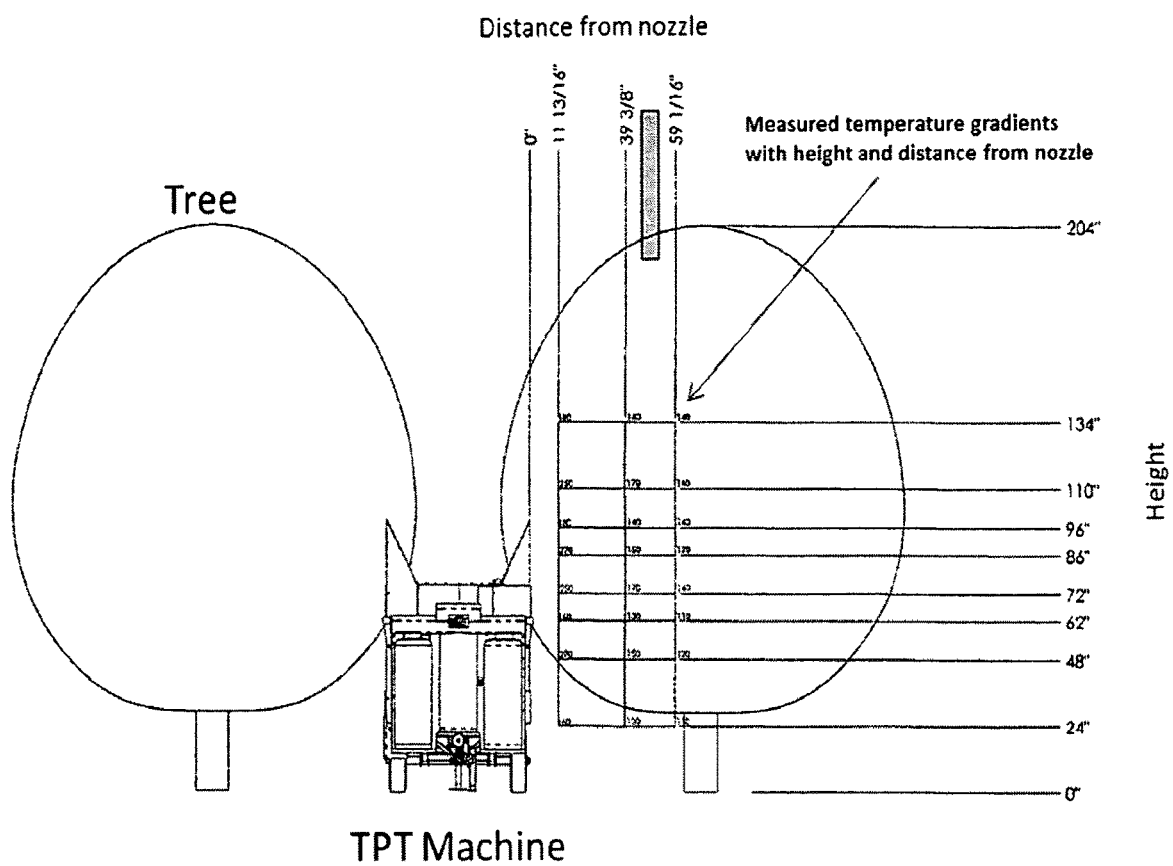

Figure 6. Modulation of temperature gradients with nozzle articulation
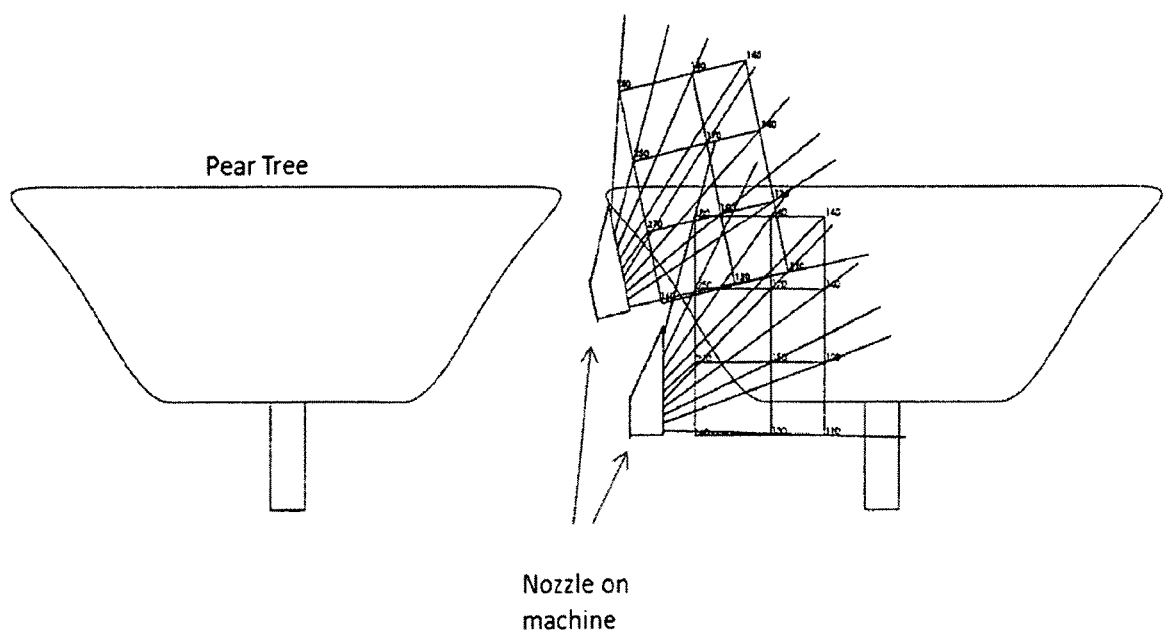

THERMAL PLANT TREATMENT AND A MACHINE TO APPLY THE TREATMENT

The entire disclosures of U.S. patent applications 61/685,745 filed Mar. 24, 2012 and 61/848,643 filed on Jan. 8, 2013 are incorporated herein by reference. This application claims the benefit of priority of these two applications.

FIELD OF INVENTION

The present invention relates to methods of improving the quality parameters of a plant's fruit in commercial agriculture. This invention more specifically relates to a method of Thermal Plant Treatment (TPT) wherein the temperature and water balance in the plant ecosystem are changed. TPT is optimized for improved plant biological functioning for commercial benefits in agriculture. The method specifically consists of applying different temperature regimes using blown hot air to a plant in the field to achieve improvements in plant-output measures such as the fruit set, initiation of flowering, resultant fruit chemistry, plant disease resistance, fruit skin thickness and fruit color. This invention also relates to specific improvements in equipment to implement TPT.

BACKGROUND OF INVENTION

Temperature treatment in agriculture and fruit culture has been used to prevent plant damage from low temperature exposure. It is known from prior art that thermal systems are used for anti-frost damage control during what is colloquially known as "cold snaps". In U.S. Pat. No. 5,934,013 to Lazo, heat from moveable tractors is proposed as a method of frost control. The objectives here are to limit the duration of exposure to low temperatures for a plant. Generally these measures are applied whenever cold snaps occur.

Temperature treatment in agriculture and fruit culture has also been used successfully to control pests in the past decade. Using burn temperatures and below burn temperatures exhaust air from heaters has been used to eliminate pests such as fungal pests such as Oidium (*Uncinula necator*) and Botritis (*Botritis cinerea*) in grapes and insect pests like *Drosophila melanogaster* larvae and mites such as *Brevipalpus chilensis*. The blown air temperatures required to effectively treat such pests are on the high side, typically 65 C to 250 C for the hot air. U.S. Pat. No. 7,134,239 Lazo discloses the method for pest control with hot air streams from a roaming tractor, The use of temperature in the cases above represents a loss minimization approach to agriculture production. There is a real commercial need to develop temperature control techniques in the field to enhance the quality of agriculture output, especially of fruit and vegetables, without the use of chemicals. There is also a need to improve fruit quality parameters so as to enhance their commercial 'nutraceutical' value.

The effect of temperature on a plant's flavonoid pathway is well documented in the literature. Flavonoid pathway controls the fruit quality parameters or plant-output measures. A good representation of the flavonoid biosynthetic pathway of grapevine is illustrated in Czemmel S. et al, Plant Physiol. 2009; Vol. 151; pgs. 1513-1530 and is included herein by reference. But no commercial practice of using a routine periodic shock to the plant ecosystem for enhancing fruit production exists. The present invention introduces the practice of routinely using periodic heat stimuli (TPT) in agricultural practice to improve the fruit quality parameters. As a result various fruit parameters are enhanced. Amongst them are riper fruit, berries with thicker skin and intense color in juice extracted from fruit, increased production of Jasmonic acid as part of self-defense expression of plant are all related to the nature of the TPT stimulus applied to the plant.

We also observe real practical limitations in the machines used in frost and pest control for use in TPT. They limit the effectiveness and efficiency of the machine for use in TPT. Temperature control and thermal profile are extremely important in TPT. The prior art machine is designed with a central burner prior to the blower that throws the air to the crop. The air is heated and thrown out in a single fixed direction. As a result, the air stream can face a substantial thermal loss and prematurely cool when ejected to the crop from the machine. Moreover, the prior art machines do not have any configurable means of transport of the ejected hot-air to different heights, row configurations, of the exposed crop. Additionally, this is also necessary for accurate and precise thermal profile control in TPT. A need exists for improvements in the existing machinery to apply TPT with increased precision for meaningful commercial gain.

SUMMARY OF THE INVENTION

There is provided a method (TPT) for improving fruit production by subjecting the plant to periodic thermal shocks with high velocity hot-air for short durations. In another embodiment, such treatment for grape vines over the growing season is demonstrated that result in improved grape harvest and improved quality of wine produced therefrom. In yet another embodiment is an improved machine to precisely control the application of such hot-air shock treatment to the plant using better burner placement, hot-air direction nozzles, temperature sensors and programmable controls.

It is the objective of the proposed TPT methodology to modify the crop environment in a manner most beneficial for commerce through the use of machines as described above. While the two main physical parameters of TPT (air temperature and air velocity) are controlled by the machine, the other factors such as frequency of application of TPT, air quality, air humidity, aerosol additives etc. can also be utilized to shape the plant's ecosystem. They can also be envisaged to be added to the described TPT methodology in order to most beneficially and comprehensively control the crop environment.

While the examples concern mostly fruit plants, TPT could be applied nut plants, vegetable plants and even forest plants.

DRAWINGS AND FIGURES

FIG. 1: Time-temperature response of a unit plant environ in the application of TPT.

FIG. 2: Two examples of Wine Chemistry Analysis

FIG. 3: Air Intake and Outflow in a TPT machine

FIG. 4: Improvements over prior art machines for precise and accurate TPT

FIG. 5: A TPT machine in application mode with thermal gradient created by the blown hot air onto a tree FIG. 6: Modulation of temperature gradients with nozzle articulation

DETAILED DESCRIPTION OF THE INVENTION

There is a need to improve crop yield and quality performance without the use of chemicals. As the use of chemicals faces increasing scrutiny, as market demand for chemical-free crops increases with organic farming, there is a need to look for ways to improve crop yield and quality without the use of chemicals. It is one objective of our TPT method to improve crop yield and quality without the use of chemicals.

The present invention provides a method to routinely incorporate heat stimulation of a plant's biochemical process mechanisms to benefit fruit quality parameters. The temperatures of application are in general lower than those used in thermal pest control methods. The frequency of application is designed to maximize a certain fruit quality parameter. We have carried out test in various locations around the globe to demonstrate these benefits of such treatments. While some treatments are well defined, others still have to be fully explored. The key ingredient is to increase the temperature in the plant with a certain periodicity to produce improved fruit quality.

It is well known and experienced that thermal stresses can affect crop. Crop Responses and Adaptations to Temperature Stress, Amarjit Basra, 2001, ISBN-1-56022-890-3). Thermal stress is one of the most constant and pervasive stresses encountered by plants. Frost damage is an example. Certain regimes of temperature can also induce stress reactions in plants. Generally thermal stresses can be clinical (with visible symptoms) or non-clinical (no visible symptoms). They can occur diurnally and seasonally. Diurnal stresses can typically be of the order of 20° C. and seasonal stresses can be of the order of 40° C. Typically, thermal stresses are characterized as low or high with the presumption that there is a thermal optimum. A zero stress condition is important from cellular protection systems of the plant and is important for preventing damage. It is an objective of the proposed TPT scheme to be configured below the temperature/time thresholds where thermal stress would negatively impact a plant.

However, it is becoming increasingly evident that certain regimes of temperature change are favorable and can result in faster growth, improved crop production or improved traits in produce from the crop. Thermal environmental regimes can affect and control the expression and transcription activities in a plant. For example, induction of small heat-shock proteins (sHSP) in the mesocarp of the Cherimoya fruit produces a chilling tolerance, which can be a desirable trait. (Sevillano, L. et al, Journal of Food Biochemistry (2010), Vol 34, Issue 3, pgs 625-638). A TPT treatment can potentially induce such sHSP.

This invention covers the surprising discovery of improved crop yield and quality that has been experienced in the field when applying thermal treatment. We noticed surprising positive effects on crop quality and yields. This discovery has suggested that desirable product traits can be engineered into a specific crop with specific thermal treatment. Without being tied to the numerous biochemical theories of plant response to thermal treatments, we seek to cover the net positive crop yield and quality improvement effects achievable from such thermal treatments as envisaged by our TPT protocol.

The TPT process involves the application of heated air at temperatures ranging from 15° C. to 200° C. and exit air speeds of the hot air vectors ranging from 10 Km/hr. to 250 km/hr. The temperature range notably goes below Lazo's 30° C. on the low temperature side, specifically with the idea that TPT is not limited to merely pest control or frost control but is designed to affect the biochemical operation of the plant to improve crop quality and volume without destroying the plant or organisms.

Temperature and hot-air vectors (speed and direction) and distance from the plant area are three main adjustable parameters of TPT. Some of the others are frequency of application, stage of plant growth. In addition to these, there are the variables of speed of the machine through the field containing the crop and also machine and/or nozzle placement with respect to the planting arrangement in the field. While the description is mainly around crop planted in rows, the application of TPT to plants in beds or in trellises is also envisaged.

The resultant effects of TPT can be characterized by set of multitude parameters such as plant yields, even-ness of yield, extent of pollination or fruit chemistry parameters such as color, weight, skin thickness, production level of antioxidant, or System Acquired Resistance (SAR), time to crop maturation, etc. All these variables and more that get affected will need to be mapped for different crops and TPT can be optimized for each depending upon the commercial objectives.

Specifically as an example, as a result of placing plants into the stress regime of TPT as delivered by the machine described above, the plant will raise its normal production levels of antioxidants (including resveratrol, etc.) and this is either produced in the developing fruit or passed into the fruit resulting in significantly higher levels of antioxidants.

Specifically as another example, as a result of placing plants into the stress regime of TPT as delivered by the machine described above, the plant will speed up bloom and provide even and broad scale pollination. This could apply to most fruit and nut plants and trees and selected vegetables including tomatoes, eggplant, melons and squash. These principles also apply in the case of leafy vegetable such as spinach, baby spinach, lettuce, and cabbage where disease control due to SAR stimulation can occur.

While most other plant treatments typically involve adding chemicals that get absorbed into the plant's biological system, the TPT methodology instead manages physical eco-system variables that condition the plant's environment and thereby create a place conducive to growth. This is done by modifying the internal and external systems associated with the plant bio system as a whole.

And by doing so, TPT methodology can create a biosystem for plant growth that does not rely solely on conventional chemical additives for growth and ability to thrive. In effect, the TPT technology can produce similar plant growth benefits without the use of chemicals additives by improving the plant's basic biological functioning.

Various theories are put forth to explain the effects of TPT treatment. Without being bound to any specific mechanism, an attempt is made to explain the mechanisms/modes of action. It is quite evident from the thermal exposure times of the crop that these treatments result in a short-duration of the crop to hot air and in a sense it is a thermal shock that is created to the plant. The protocol can then be more suitably called Thermal Shock Plant treatment (TSPT) and in our view terms TPT and TSPT are interchangeable.

The thermal shock produced in the plant environment with our inventive method has a maximum timed exposure e of 15 seconds per unit plant area. As an example, in a grape vine the unit plant area is defined by the square area of grape leaves stems and vines approximating a 4 inch by 4 inch square sector orthogonal to the air velocity. Typical time-temperature profile at any point in plant environment takes the profile shown in FIG. 1 below during treatment as a result of the thermal shock imparted.

As shown in FIG. 1, in this specific case, the temperature of the unit plant area's environ reaches a maximum (100°

C.) within 10 seconds. This response would depend upon on plant area's location with respect to the hot-air ejected from the machine duct. The temperature would be expected to slowly decay back to the ambient over time as shown in FIG. 1. This profile shows the nature of the curve and the maximum temperature, exposure time and the decay time will vary depending on many factors. The maximum temperature will depend upon numerous variables including the setting of the hot air source at the TPT machine. As the TPT machine traverses through the field, one can expect such thermal shock profiles to be generated wherever the hot-air is blown. This modifies the plant environ for a certain period of time and if done repeatedly would affect the plant's mechanisms. Proper selection of such thermal shocks in terms of time, temperature and frequency would allow one to tailor the impact for specific plants in a TPT protocol for that species of plant.

The area under the curve is indicative of the thermal energy imparted to the environment over time. This includes a change in the kinetic constants of all the biosynthetic reactions including the reactions of the flavonoid biosynthetic pathway. It is postulated that such rapid change in thermal energy component may trigger favorable reactions for fruit quality enhancement.

Additionally, the area under this curve is important to the water transport processes occurring around the plant and the other elements of the bio-sphere including insects, plants and diseases. These processes are diffusion driven and affect the water balance between the atmosphere and the internal water vapor status of the plant and organisms in the biosphere.

Today many crop management protocols require "deficit water management" techniques to improve fruit quality (Example Brix in grapes, harvest quality in cantaloupes) and it is postulated that this TPT protocol is a management tool in that direction that can help improve fruit quality.

Additionally, water balance is affected by the velocity of the hot air with respect to the stationary plant part due to the effect of moving hot dry air on the plant and the organisms of the plant's biosphere. The diffusion gradient created by the TPT due to diffusion deficit as there is a rapid loss of water by the plant and other organisms to the outside air. The loss of water also makes it difficult for pests and diseases to survive.

Additionally, the movement of high velocity air across leaf surfaces has been demonstrated to result in the stimulation of those bio-synthetic pathways which lead to the phenomenon "Systemic Acquired Resistance" (SAR) to disease and Insect attack and infestation.

We provide herein some definitions for terms used in the present application.

Plant-output measure: A quantitative attribute of a plant or its fruit which is usually of commercial importance in agricultural production and can be measured and used in comparatory analysis of crops. Synonymously used with the term "fruit quality parameter'.

Plant or crop: Interchangeably used herein. Examples are apple tree, vegetable plant, nut tree.

Thermal Plant Treatment: A process of altering a plant ecosystem—thermal and water balance—with the programmed use of blown hot air. The exposure is optimized specifically for each plant variety as needed. We also refer to it as a thermal shock treatment. This treatment is applied with a machine that to typically traverses the farm.

Plant Unit: A measure of plant productive surface in square feet or cubic feet.

Fruit Set: The weight of fruit produced by flowers and retained on the plant per plant unit.

Fruit Weight: The weight of fruit finally produced per plant unit. Another equivalent term is fruit yield.

Fruit Count: The number of fruit produced per plant unit.

Flowering: Number of flowers per plant unit. Also referred to as initiation of flowering.

Fruit Chemistry: All of the chemicals in the flavonoid biosynthetic pathway of a fruit.

Wine Chemistry Content of compounds that contribute to wine quality as measured in standardized test results as shown in FIG. 2.

TPT can unleash biological changes in a plant to impact its fruit. Some of these positive changes, which can result in significant economic benefits, are (1) Increase in the fruit set, fruit count, fruit weights
(2) Increased initiation of flowering
(3) Improved fruit chemistry through impact on the biochemical kinetics and locus of the flavonoid biosynthetic pathway leading to improvements in flavonols, PAs and anthocyanins. As an example, improved grape chemistry that results in improved wine chemistry parameters
(4) Thickening of leaves (which can potentially result in higher photosynthesis activity increasing energy capture from the sun for the plant).
(5) Induction of Systemic Acquired Resistance (SAR) in plants to produce tolerance
(6) Increase in fruit skin thickness
(7) Increase in the darker/deeper coloration of the grape and resultant wine coloration The Lazo machine described in U.S. Pat. No. 7,134,239 can be improved in two ways and this forms the basis of our improvement of the machine in the present invention making it more suitable for precise control of the TPT.

One is to post-heat the air as it leaves the turbine on its way out to the plant as opposed to preheat the air as in the Lazo machine. This reduces thermal losses and may provide hotter air at the application points. Our improvement thus provides burner tubes located at the exit of the blower as opposed to the inlet burner in the Lazo machine. Fuel usage is beneficially impacted and improved temperature control at the point of application is achieved.

Secondly, configurable specialized articulating trunks or nozzle equipment can be added to the blower exit delivery end so that the impacted plant can be reached with hot air in more efficient ways to prevent thermal losses and higher efficiency in heat transfer to the plant environ. For example, air speed vectors for the hot-air can be defined and the hot air flows set up with such configurable equipment to obtain well optimized hot air flow tailored to specific characteristic of a certain crop and to specific distance from the plant area. A hot-air vector field can be define for each crop for its specific size and stage of growth. The vector field can be optimized based on crop results. The optimal air vectors at the right temperature can benefit the plant in various ways, as is described later. The heat transfer to the plant and it's envron is thus more precisely controlled and more configurable to a crop and the wastage of heat is minimized. Furthermore, more burners to heat air can be added to the articulating trunks equipment so that the air is heated at the point of application if needed.

Since the hot air exit from the machine is movable due to articulating nozzle/trunk extension, there is an advantage in having movable heat sources rather than static heat source as in the prior art machine. This is critical to the functionality of the process for tall trees and multiple row crops. The Lazo machine is a fixed single burner. We use multiple burners close to the application targets and potentially quite remote from the blower and we may use multiple blowers in larger machines. The Lazo machine did not work when we had to treat rows of plants that were more than a few feet from the machine. With our inventive design we can move an unlimited number of burners and blowers to application sites. The multiple burner differentiation from prior art is also an important distinction that has resulted from the lack of adequate temperature control with the Lazo machine in our TPT trials.

FIG. 4 shows the proposed improvements of our invention with respect to prior art machines. The three improvements of heater placement, the use of articulating delivery nozzles/trunk and the incorporation of feedback control for hot air application enable precise and accurate application of the hot air to the plant area in a reproducible manner. This result in better control of temperature and air velocity in the application of the TPT protocol.

The treatment can be applied with a unit that is tractor mounted or scaled down and can be backpack mounted. The same unit can be built into a self-contained mobile device, on wheels or tracks, and can be utilized in a manner similar to small automobile, small or full sized truck, a suitably sized water craft or a mobile device similar to that known as an All-terrain Vehicle.

Example 1 Increase in Fruit Yield

In 2012, we conducted replicated TPT protocols in John Anthony-Carrefour Vineyard farms at Napa, Calif. on grape varieties of Cabernet Savignon, Savignon Blanc, Merlot, Malbec and Petit Verdot.

The TPT protocols were conducted at a hot air discharge temperatures of 100 degrees C. for a period of 13 weeks in a weekly application. The hot air was delivered at a machine speed of 3.5 mph (5.1 ft./s). Applications were done in May through August 2012 between 7 and 11 AM when ambient temperatures were typically between 4° C. and 22° C. The grape vines during this period were in the stages between fruit set and harvest. Grape vines to be treated were selected for uniformity of growth, habit and health and were separated by a buffer row of similar vine (so that one row did not affect the results on the other). Grape vines to be used as control were also included.

The resultant fruit yield responses are shown below. The data compares the Berry Count for vines with TPT and without TPT. The data shows significant advantage in Berry Count with the TPT treatment.

| | Berry Count 2012 | | | | | | | | |
|---|---|---|---|---|---|---|---|---|---|
| | TPT | AVG | STDEV | Control | AVG | STDEV | Δ IN MEAN | Δ IN TOT | % Difference |
| John Anthony - Carrefour Vineyard - Napa, CA<br>Cabernet Sauvignon | | | | | | | | | |
| Block 3 | | | | | | | | | |
| Shade side | 134 | 9 | 25 | 102 | 7 | 13 | 2 | 32 | 31% |
| Sunny side | 165 | 11 | 26 | 114 | 8 | 21 | 3 | 51 | 45% |
| OVERALL | 299 | 10 | | 216 | 7 | | 3 | 83 | 38% |
| John Anthony - Carrefour Vineyard - Napa, CA<br>Savignon Blanc | | | | | | | | | |
| Block 6 | | | | | | | | | |
| Shade side | 108 | 7 | 22 | 92 | 6 | 12 | 1 | 16 | 17% |
| Sunny side | 142 | 9 | 27 | 104 | 7 | 19 | 3 | 38 | 37% |
| OVERALL | 250 | 8 | | 196 | 7 | | 2 | 54 | 28% |
| John Anthony - Carrefour Vineyard - Napa, CA<br>Merlot | | | | | | | | | |
| Block 5 | | | | | | | | | |
| Shade side | 122 | 8 | 17 | 92 | 6 | 11 | 2 | 30 | 33% |
| Sunny side | 127 | 8 | 22 | 98 | 7 | 13 | 2 | 29 | 30% |
| OVERALL | 249 | 8 | | 190 | 6 | | 2 | 59 | 31% |
| John Anthony - Rossi Vineyard - Napa, CA<br>Malbec | | | | | | | | | |
| Block 11 | | | | | | | | | |
| Sunny side | 245 | 16 | 52 | 242 | 16 | 49 | 0 | 3 | 1% |
| John Anthony - Carrefour Vineyard - Napa, CA<br>Petit Verdot | | | | | | | | | |
| Block 10A | | | | | | | | | |
| Shade side | 159 | 23 | 37 | 126 | 18 | 21 | 5 | 33 | 26% |
| Sunny side | 187 | 23 | 30 | 148 | 19 | 15 | 5 | 39 | 26% |
| OVERALL | 346 | 23 | | 274 | 18 | | 5 | 72 | 26% |

Example 2: Increase in Fruit Yield

Resultant fruit yield results from the TPT treatment and replicated trials of the protocol of Example 1 on Pinot Noir grapes was done in Washington State at Adelsheim Vineyard. Limited results show a large 121% increase in fruit yield from control.

| | PINOT NOIR GRAPES Adelsheim Vineyard WASHINGTON | |
|---|---|---|
| | Lot | Weights Tons |
| TPT | A1 | 0.42 |
| | A2 | 0.44 |
| CONTROL | B1 | 0.19 |
| | B2 | 0.2 |

Yld. Increase 121%

Example 3: Increase in Fruit Yield and Number of Fruit—Savignon Blanc

The crop from Example 1 was selectively analyzed later in the growing season for fruit yield and the number of fruit. We found that while the yield showed an increase from that of control, the number of fruit also increased from that of control. This typically leads to more skin content in the resultant wine produced from the grape which can be beneficial to wine quality.

An increase of 19.48% on combined fruit weight, an increase of 26.2% on the number of berries, and a decrease in average berry weight of 5.4% is indicated from the following raw data of Bunch weight and Berry Counts.

| | Napa Sauvignon Blanc BLOCK 1 Not Irrigated | | | |
|---|---|---|---|---|
| | Sunny Side Bunch Weight | Shady Side Bunch weight | Sunny Side Berry Count | Shady Side Berry Count |
| | Ounces | | | |
| TEST Bunch Number | | | | |
| 1 | 8.6 | 4.7 | 116 | 54 |
| 2 | 4.5 | 4.9 | 51 | 64 |
| 3 | 7.2 | 3.4 | 120 | 37 |
| 4 | 5.2 | 6.6 | 64 | 94 |
| 5 | 9.0 | 3.3 | 122 | 51 |
| 6 | 6.2 | 2.8 | 83 | 36 |
| 7 | 5.6 | 7.5 | 67 | 116 |
| 8 | 7.7 | 8 | 103 | 122 |
| 9 | 6.0 | 2.3 | 83 | 31 |
| 10 | 5.5 | 7.8 | 98 | 106 |
| 11 | 4.4 | 3.8 | 77 | 52 |
| 12 | 8.7 | 7.6 | 145 | 89 |
| 13 | 9.2 | 11.3 | 156 | 154 |
| 14 | 2.9 | 8.3 | 36 | 121 |
| 15 | 7.7 | 7.6 | 98 | 64 |
| Total | 98.4 | 89.9 | 1419.0 | 1191.0 |
| CONTROL Bunch Number | | | | |
| 1 | 6.3 | 4.5 | 89 | 44 |
| 2 | 5.1 | 5.4 | 60 | 62 |
| 3 | 8.9 | 5.8 | 134 | 71 |
| 4 | 3.8 | 4.2 | 43 | 40 |

-continued

| | Napa Sauvignon Blanc BLOCK 1 Not Irrigated | | | |
|---|---|---|---|---|
| | Sunny Side Bunch Weight | Shady Side Bunch weight | Sunny Side Berry Count | Shady Side Berry Count |
| | Ounces | | | |
| 5 | 6.2 | 3.6 | 83 | 39 |
| 6 | 4.9 | 3.4 | 67 | 47 |
| 7 | 6.2 | 5.8 | 86 | 43 |
| 8 | 8.1 | 3.3 | 118 | 71 |
| 9 | 9.8 | 4.3 | 143 | 77 |
| 10 | 4.5 | 6.6 | 76 | 78 |
| 11 | 2.3 | 7.9 | 33 | 99 |
| 12 | 4.5 | 2.9 | 55 | 45 |
| 13 | 7.1 | 2.5 | 75 | 47 |
| 14 | 5.3 | 5.6 | 67 | 70 |
| 15 | 3.6 | 5.2 | 39 | 66 |
| | 86.6 | 71 | 1168 | 899 |

Example 4 Increase in Fruit Yield and Number of Fruit—Pinot Noir

Field trials conducted at Klopp Ranch—Thorn Road Vineyard, Sonoma, Calif. on this variety with the TPT protocol.

Pinot Noir crop was selectively analyzed for fruit yield and the number of fruit. We found that while the yield showed an increase from that of control, the number of fruit also increased from that of control. This typically leads to more skin content in the resultant wine produced which can be beneficial to wine quality.

An increase of 22.4% on combined fruit weight, an increase of 15.6% on the number of berries, and an increase in average berry weight of 5.8% is indicated from the following raw data of Bunch weight and Berry Counts.

| | Klopp Pinot Noir | | | |
|---|---|---|---|---|
| TEST Bunch Number | Sunny Side Bunch Weight Row 22 | Shady Side Bunch Weight Row 21 | Sunny Side Berry Count Row 22 | Shady Side Berry Count Row 21 |
| | Ounces | | | |
| 1 | 5.1 | 2.6 | 139 | 97 |
| 2 | 4.3 | 2.8 | 99 | 72 |
| 3 | 2.5 | 5.1 | 82 | 127 |
| 4 | 4.2 | 4.2 | 108 | 146 |
| 5 | 8.7 | 5.3 | 239 | 153 |
| 6 | 4.3 | 3.4 | 163 | 138 |
| 7 | 3.7 | 3.9 | 115 | 132 |
| 8 | 3.7 | 5.2 | 142 | 134 |
| 9 | 4.4 | 2.8 | 108 | 77 |
| 10 | 2.5 | 3.8 | 87 | 121 |
| 11 | 5.8 | 5.6 | 150 | 112 |
| 12 | 4.2 | 2.6 | 109 | 105 |
| 13 | 4.1 | 4.4 | 118 | 157 |
| 14 | 4.6 | 4 | 127 | 126 |
| 15 | 3.9 | 5.3 | 113 | 135 |
| | | | 26 | 87 |
| Total | 66.0 | 61.0 | 1925.0 | 1919.0 |
| CONTROL Bunch Number | Sunny Side Bunch Weight Row 25 | Shady Side Bunch Weight Row 26 | Sunny Side Berry Count Row 25 | Shady Side Berry Count Row 26 |

-continued

| | Klopp Pinot Noir | | | |
|---|---|---|---|---|
| 1 | 1.7 | 7 | 68 | 84 |
| 2 | 3.2 | 5 | 51 | 105 |
| 3 | 2.5 | 4 | 86 | 93 |
| 4 | 2.7 | 5 | 82 | 175 |
| 5 | 2.8 | 3.1 | 108 | 131 |
| 6 | 6.3 | 3.3 | 159 | 114 |
| 7 | 4 | 2.2 | 85 | 91 |
| 8 | 1.7 | 3.5 | 79 | 144 |
| 9 | 4.1 | 4.4 | 97 | 122 |
| 10 | 4.4 | 2.4 | 121 | 183 |
| 11 | 2.2 | 4.4 | 144 | 147 |
| 12 | 2.3 | 4.6 | 101 | 95 |
| 13 | 4.4 | 1.7 | 67 | 69 |
| 14 | 3 | 2.6 | 107 | 104 |
| 15 | 1.7 | 3.6 | 69 | 134 |
| | | | 56 | 54 |
| | 47 | 56.8 | 1480 | 1845 |

Example 5 Improvement in Wine Chemistry Parameters

FIG. 2 shows Wine Chemistry Analysis results, from ETS Labs (St. Helena Calif.) Reports 572150 of 24 Sep. 2012 and 578033 of 16 Oct. 2012, both included by reference here-in, show that for some of the grapes harvested from Example 1, there are impacts on polymeric anthocyanins, gallic acid, caftaric acid, catechin, epicatechin and tannin content of wine thereby indicating a stimulation of sections of the flavonoid biosynthesis pathway with the TPT treatment.

Example 6 Improvement in Wine Quality from Taste Testing Results

We conducted 9 expert blind tasting tests (from University and Industry) of bottled wine (made at Fresno State University, Fresno Calif.) made from the Malbec grape grown in Napa Calif. subjected to the TPT treatment of Example 1. A unanimous rating of BTC (Better than Control) was obtained in this testing.

| WINE TASTING RESULTS | | | | Fruity |
|---|---|---|---|---|
| No. | Experts from | Fruitiness | Mouthfeel | Aroma |
| 1 | Fresno State Univ. | BTC | BTC | BTC |
| 2 | Fresno State Univ. | BTC | BTC | BTC |
| 3-4 | Agrothermal Technicians | BTC | BTC | BTC |
| 5-9 | Wine Industry Professionals | BTC | BTC | BTC |

A similar tasting test from wine in casks —with wine made from the Pinot Noir grape (subjected to the TPT treatment of Example 1 made at Adelsheim Winery in Washington State —also resulted in a unanimous BTC rating.

Example 7—Plant Thermal Exposure Environment with a TPT Machine

Potential plant environ temperatures from hot air ejected from a TPT machine were mapped with the use of thermocouple sensors to establish the thermal short-duration exposure obtained in a TPT treatment by measurement of the gradient field at several points in the plant's environ.

FIGS. 5 and 6 shows the stationary (zero mph TPT machine) profile temperatures measured with the use of thermocouples around the typical ejection of hot air from the TPT machine onto a crop target. This shows that the temperature gradient field created can be used to blanket the unit plant area environ. These gradient temperature fields can be reproducibly applied with adequate control measures and thermal sensing instrumentation in a dynamically programmed or pre-determined TPT protocol. The temperature field can be adjusted by controlling the distance to the plant with articulating nozzle for the hot air stream, controlling the exit temperature of the blown air, controlling the velocity of the blown air (both direction and speed).

We claim:

1. A method of treating a plant, the method comprising:
    applying a series of heat treatments to a plant area a target plant, the series of heat treatments inducing a biochemical reaction in the target plant and causing the target plant to increase fruit set in the plant area, wherein each one of the series of heat treatments comprise:
    generating a stream of air with a fan;
    heating the stream of air at a location downstream of the fan to generate a stream of heated air;
    ejecting the stream of heated air from a nozzle at a velocity of 10-250 km/hr and onto the plant area of the target plant such that the stream of heated air impinges on the target plant in the plant area for a maximum of fifteen seconds to increase a temperature of the plant area of the target plant to a first temperature greater than an ambient temperature, wherein the first temperature is between 25° C. and 40° C., inclusive;
    removing the stream of heated air from the target plant after a first time duration; and
    allowing the temperature of the plant to decay from the first temperature to the ambient temperature;
    wherein the ambient temperature is at least 4° C.;
    wherein the plant area of the target plant is an area of the target plant in which blooms are located;
    wherein at least one of the series of heat treatments is applied in the time period occurring after bloom and prior to fruit set.

2. The method of claim 1, wherein the fan is a centrifugal fan.

3. The method of claim 1, wherein applying the series of heat treatments is performed during a time period occurring between fruit set and harvest.

4. The method of claim 1, further comprising:
    articulating the nozzle to alter a flow of the stream of heated air.

5. The method of claim 1, wherein the step of heating the stream of air to generate the stream of heated air comprises:
    heating the stream of air with a burner disposed in a duct extending between the fan and the nozzle.

6. The method of claim 1 wherein at least one of the series of heat treatments is applied at least fortnightly.

7. The method of claim 1, wherein the first temperature is between 25° C. and 35° C., inclusive.

8. The method of claim 1 wherein the plant being treated is selected from the group consisting of fruit plants, herbs, coffee, tea, nut plants and vegetable plants.

9. The method of claim 8, wherein the fruit-plant is selected from a group consisting of grape, kiwi, bushberries, strawberries, cranberries, vine fruit, apple pom fruit, pear, cherry, olive and stone fruit.

10. The method of claim 1, wherein each one of the series of heat treatments is applied by a thermal plant treatment (TPT) machine comprising:

a chassis configured to navigate between crop rows;
a fan supported by the chassis;
a first duct supported by the chassis and extending between the fan and a first nozzle, the first duct configured to receive a first stream of air from the fan; and
a first burner disposed in the first duct, the first burner configured to heat the first stream of air to generate a first heated stream of air;
a second duct supported by the chassis and extending between the fan and a second nozzle, the second duct configured to receive a second stream of air from the fan; and
a second burner disposed in the second duct, the second burner configured to heat the second stream of air to generate a second heated stream of air;
wherein the first nozzle is configured to direct the first heated stream of air onto a plant to increase a temperature of the plant above an ambient temperature;
wherein the first nozzle is configured to direct the first heated stream of air onto a plant disposed on a first lateral side of the chassis, and the second nozzle is configured to direct the second heated stream of air onto a plant disposed on a second lateral side of the chassis.

11. The method of claim 10, wherein the fan is a centrifugal fan.

12. A method of treating a plant, the method comprising:
applying a series of heat treatments to a plant area of a target plant, the series of heat treatments inducing a biochemical reaction in the target plant and causing the target plant to increase fruit set in the plant area, wherein each one of the series of heat treatments comprise:
increasing a temperature of air in the plant area from a first temperature to a second temperature over a first time duration and with a heated air stream;
maintaining the temperature of air at the second temperature for a second time duration, the second time duration being longer than the first time duration; and
allowing the temperature of air to decay from the second temperature to the first temperature over a third time duration, the third time duration being longer than the second time duration;
wherein the plant area of the target plant is an area of the target plant in which blooms are located;
wherein at least one of the series of heat treatments is applied in the time period occurring after bloom and prior to fruit set.

13. The method of claim 12, wherein the first temperature is an ambient temperature.

14. The method of claim 12, wherein the second temperature is between 15-200 degrees C., inclusive.

15. The method of claim 14, wherein the second temperature is between 25-35 degrees C., inclusive.

16. The method of claim 12, wherein a combination of the first time duration and the second time duration is up to fifteen seconds.

17. The method of claim 16, wherein the combination of the first time duration and the second time duration is up to ten seconds.

* * * * *